United States Patent
Nakai et al.

(10) Patent No.: US 7,440,199 B2
(45) Date of Patent: Oct. 21, 2008

(54) MANUFACTURING METHOD OF OPTICAL COMPONENT AND CAMERA MODULE

(75) Inventors: Izuru Nakai, Toyonaka (JP); Seiji Kumazawa, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 224 days.

(21) Appl. No.: 11/243,968

(22) Filed: Oct. 6, 2005

(65) Prior Publication Data

US 2006/0077575 A1   Apr. 13, 2006

(30) Foreign Application Priority Data

Oct. 8, 2004  (JP)  ............... 2004-295484

(51) Int. Cl.
*G02B 7/02* (2006.01)
(52) U.S. Cl. .................. 359/819; 359/829
(58) Field of Classification Search ............. 359/811, 359/819, 642, 813, 829
See application file for complete search history.

(56) References Cited

U.S. PATENT DOCUMENTS 6,270,222 B1 * 8/2001 Herpst .................. 359/511
2002/0005997 A1 * 1/2002 Oba ..................... 359/819
2005/0242410 A1 * 11/2005 Groot et al. ............. 257/433
2006/0049154 A1 * 3/2006 Clifford et al. ......... 219/121.64
2008/0094738 A1 * 4/2008 Lee ..................... 359/829

FOREIGN PATENT DOCUMENTS

| EP | 1372016 A2 * | 12/2003 |
| JP | 60-214931 A | 10/1985 |
| JP | 62018508 A * | 1/1987 |
| JP | 62-142092 A | 6/1987 |

OTHER PUBLICATIONS

N. Matsushita et al., "Laser welding for precise micro-fabrication of IT-products", Lecture Overview of Forum on Micro Joining and Processing 2004, Jul. 2004, pp. 35-37.

* cited by examiner

*Primary Examiner*—Jessica T Stultz
*Assistant Examiner*—Mahidere S Sahle
(74) *Attorney, Agent, or Firm*—Steptoe & Johnson LLP

(57) ABSTRACT

In an optical component where fixation of resin welding is performed by emitting a laser beam to screwing parts of an inner lens barrel and an outer lens barrel after focus adjustment, the laser beam is emitted to melt and cure a joint of the screwing part of the inner lens barrel and the screwing part of the outer lens barrel by 0.5 mm to 3.0 mm in a direction parallel to a direction of protrusion of the inner lens barrel relative to the outer lens barrel, so that welding and fixation are completed.

6 Claims, 5 Drawing Sheets

MANUFACTURING METHOD OF OPTICAL COMPONENT AND CAMERA MODULE

FIELD OF THE INVENTION

The present invention relates to a manufacturing method of an optical component, the method having a laser welding process as that of a compact camera module mounted in a camera mobile phone or the like.

BACKGROUND OF THE INVENTION

Such a camera module is configured as shown in FIGS. 7A and 7B.

As shown in FIG. 7A, a lens 1 for forming an image in an image pickup device (not shown) is held by the inner periphery of an inner lens barrel 2. The image has entered from the outside. A screwing part 3 is formed on the outer periphery of the inner lens barrel 2. The inner lens barrel 2 is screwed to and held by an outer lens barrel 5. The inner periphery of the outer lens barrel 5 has a screwing part 4 screwed to the screwing part 3 of the inner lens barrel 2.

In focus adjustment of the camera module, the protrusion amount of the inner lens barrel 2 is adjusted by rotating the inner lens barrel 2 relative to the outer lens barrel 5, and the inner lens barrel 2 and the outer lens barrel 5 are fixed to each other with a UV cured resin after the focus adjustment. Alternatively, as shown in the plan view of FIG. 7B, a laser beam 7 is emitted over a joint 6 of the screwing part 3 of the inner lens barrel 2 and the screwing part 4 of the outer lens barrel 5 to fix the inner lens barrel 2 and the outer lens barrel 5 by welding. Reference numeral 10 denotes a base part provided on the base end of the outer lens barrel 5. This welding technique is disclosed in the following non-patent document:

"Precision Micromachining of Home Information Appliances", Naohisa Matsushita and Susumu Iida, Lecture Overview of FORUM on MICRO JOINING and PROCESSING 2004, pp. 34 to 38, published on Jul. 16, 2004 by "International Welding Show Forum Steering Committee" Secretariat, Sanpo Publications, Inc.

Generally, an LD laser device has a linear light-emitting part. When the laser beam 7 is passed through an optical fiber as described in the non-patent document, the light guide part (core) of the optical fiber is circular in cross section and thus the laser beam 7, which undergoes multiple reflection through the light guide part, is emitted in a circular spot with a diameter of about 0.2 mm. A part 8 of the inner lens barrel 2 and the outer lens barrel 5 is melted, solidified into a thin layer (depth: about 0.2 mm) as shown in FIG. 7C, and welded with a resin, so that focus is fixed. The rotational torque strength is about 0.6 to 1.4 N·cm. As shown in FIG. 7B, since the laser beam is emitted to only one point, an inner lens barrel 2 may be fixed while being displaced from the center by shrinkage during the solidification of the resin.

Techniques for laser-welding resin members are disclosed in many reports including Japanese Patent Laid-Open No. 60-214931. The following method is well known: a translucent resin allowing the passage of a laser beam and an absorbent resin absorbing a laser beam are stacked, and a laser beam is emitted from the side of the translucent resin to heat a surface of the absorbent resin, so that the resins are welded. Japanese Patent Laid-Open No. 62-142092 discloses a method of interposing an absorbent adhesive between resin members and heating the adhesive with a laser beam to join the resin members.

In fixation with a conventional UV adhesive, the curing time of the adhesive is long and thus tact time is increased. Further, since the adhesive is necessary, the manufacturing cost is increased. Moreover, it is troublesome to manage the adhesive.

In contrast to this technique, in the welding and fixing with the irradiation of the laser beam 7 in the non-patent document, it is possible to achieve short tact time and low manufacturing cost, and thus the technique of the non-patent document is suitable for mass production. However, with the irradiation of the laser beam in a circular spot having a diameter of about 0.2 mm, only the top surfaces of the inner lens barrel 2 and the outer lens barrel 5 are melted and cured, resulting in a low welding strength in relation to a large melted mark. Further, this technique causes undesirable appearance quality.

To be specific, when a melted resin portion caused by the irradiation of the laser beam is a thin surface layer, under use environment of high temperatures and humidity or in the event of an external torque and vibrations in the rotation direction, the melted resin portion may be easily destroyed and the position of the protruded inner lens barrel 2 may be changed. Thus, the focus position of the lens 1 may be changed and cause a defective image.

When laser irradiation energy and the spot diameter are reduced to form a smaller melted mark, welding strength further decreases. In the case of fixing by welding, the inner lens barrel 2 may be fixed while being displaced by shrinkage during the solidification of the resin.

An object of the present invention is to provide a manufacturing method of an optical component whereby fixing strength between the inner lens barrel 2 and the outer lens barrel 5 is improved, higher appearance quality is obtained, and fixing accuracy between the inner lens barrel 2 and the outer lens barrel 5 is increased.

DISCLOSURE OF THE INVENTION

A manufacturing method of an optical component of the present invention, for manufacturing an optical module in which an inner lens barrel having a screwing part formed on its outer periphery is screwed to an outer lens barrel having a screwing part on its inner periphery, the screwing part of the outer lens barrel being screwed to the screwing part of the inner lens barrel, comprises: adjusting an amount of protrusion of one of the inner lens barrel and the outer lens barrel relative to the other, and afterwards emitting a laser beam to melt and cure at least one surface of a joint of the screwing part of the inner lens barrel and the screwing part of the outer lens barrel in a direction parallel to a direction of the protrusion, so that the inner lens barrel and the outer lens barrel are fixed by welding. The laser beam is emitted from a laser beam passage opening formed on the outer lens barrel. The laser beams are simultaneously emitted to a plurality of points in the circumferential direction of the screwing part. The laser beam is emitted in a linear shape along the circumferential direction of the screwing part.

Another manufacturing method of a camera module of the present invention comprises: screwing an inner lens barrel having a lens on its inner periphery and a screwing part formed on its outer periphery to an outer lens barrel having a screwing part on its inner periphery, the screwing part of the outer lens barrel being screwed to the screwing part of the inner lens barrel, adjusting an amount of protrusion of one of the inner lens barrel and the outer lens barrel relative to the other, and emitting a laser beam to a joint of the screwing part of the inner lens barrel and the screwing part of the outer lens barrel to melt and cure at least one surface of the joint of the screwing part of the inner lens barrel and the screwing part of the outer lens barrel by 0.5 mm to 3.0 mm in a direction parallel to a direction of the protrusion.

The laser beam is emitted from a laser beam passage opening formed on the outer lens barrel. The laser beams are simultaneously emitted to a plurality of points located in the circumferential direction of the screwing part. The laser beam is emitted in a linear shape of about 0.7 mm×0.1 mm along the circumferential direction of the screwing part.

A camera module of the present invention comprises an inner lens barrel having a lens on its inner periphery and a screwing part formed on its outer periphery, and an outer lens barrel having a screwing part on its inner periphery, the screwing part of the outer lens barrel being screwed to the screwing part of the inner lens barrel, wherein at least one surface of a joint of the screwing part of the inner lens barrel and the screwing part of the outer lens barrel is melted and cured by 0.5 mm to 3.0 mm in a direction parallel to a direction of protrusion of the inner lens barrel relative to the outer lens barrel.

The outer lens barrel comprises a laser beam passage opening having one end opened on the screwing part of the outer lens barrel. The laser beam passage opening is provided at two or more points in the circumferential direction of the screwing part.

With this configuration, the laser beam is emitted to the joint of the screwing part of the inner lens barrel and the screwing part of the outer lens barrel to melt and cure at least one surface of the joint of the screwing part of the inner lens barrel and the screwing part of the outer lens barrel by 0.5 mm to 3.0 mm in the direction parallel to the protrusion direction, so that fixation is performed by welding. Thus, high fixation strength can be obtained.

The laser light is emitted from the laser beam passage opening formed on the outer lens barrel, so that no melted mark appears on the top face of the lens barrel.

The laser beams are simultaneously emitted to two or more points in the circumferential direction of the screwing part, thereby reducing a change of the position of the lens barrel during laser welding and obtaining an accurate fixing method.

DESCRIPTION OF THE EMBODIMENTS

Figure 7C:
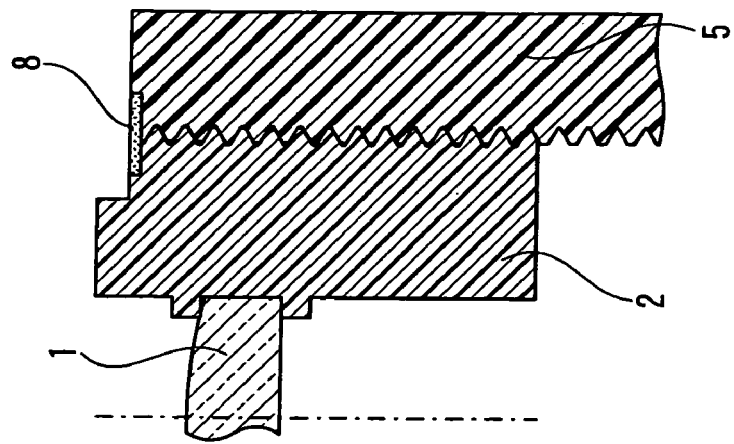
FIGS. 7A, 7B, and 7C are a processing sectional view and a plan view of a conventional camera module.
Figure 7B:
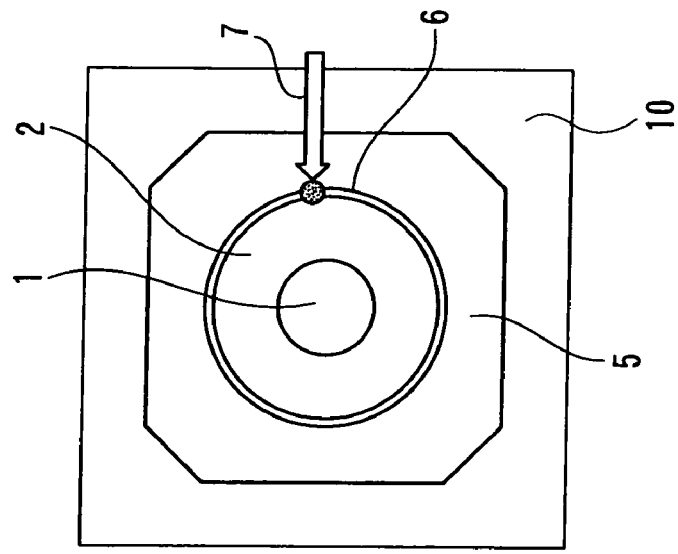
Figure 7A:
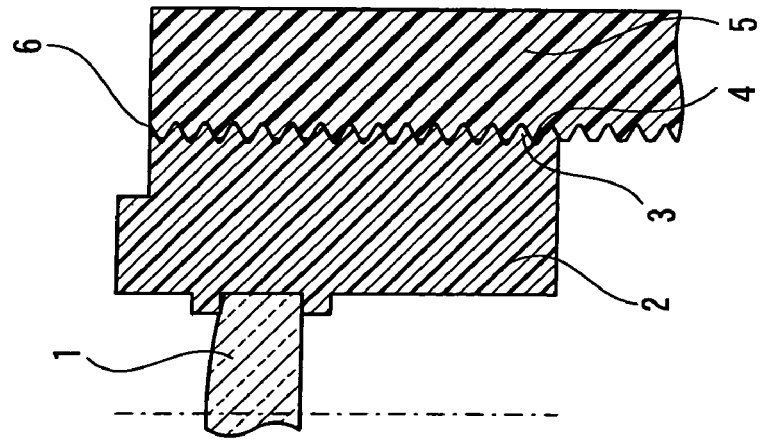

The manufacturing methods of the present invention will be discussed below in accordance with specific embodiments. Constituent elements having the same actions as FIGS. 7A, 7B, and 7C showing the conventional example are indicated by the same reference numerals.

Embodiment 1

FIGS. 1A, 1B, 2A, and 2B show (Embodiment 1) of a manufacturing method of a camera module according to the present invention. The camera module has the following size: one side of a base part 10 is 11.0 mm and a thickness formed by the base part 10 and an outer lens barrel 5 is 6.0 mm.

Figure 1C:
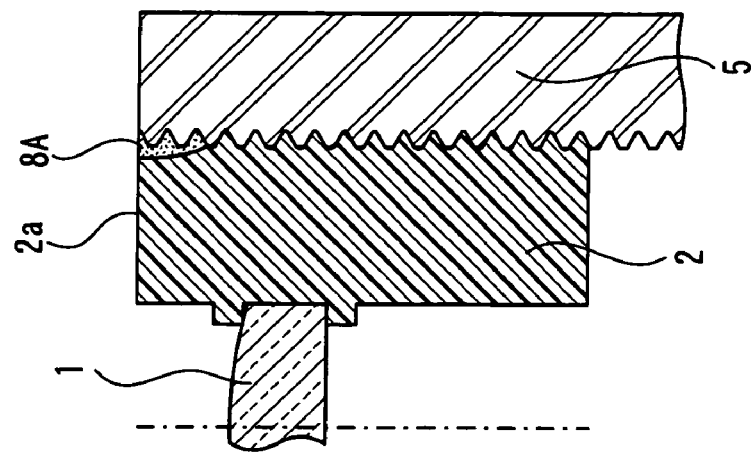
FIGS. 1A, 1B, and 1C are longitudinal sectional views showing a camera module in a manufacturing process according to (Embodiment 1) of a manufacturing method of an optical component of the present invention.
Figure 1B:
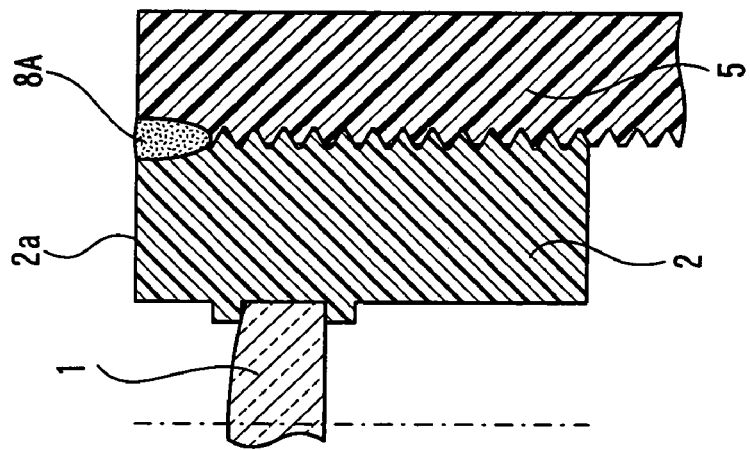
Figure 1A:
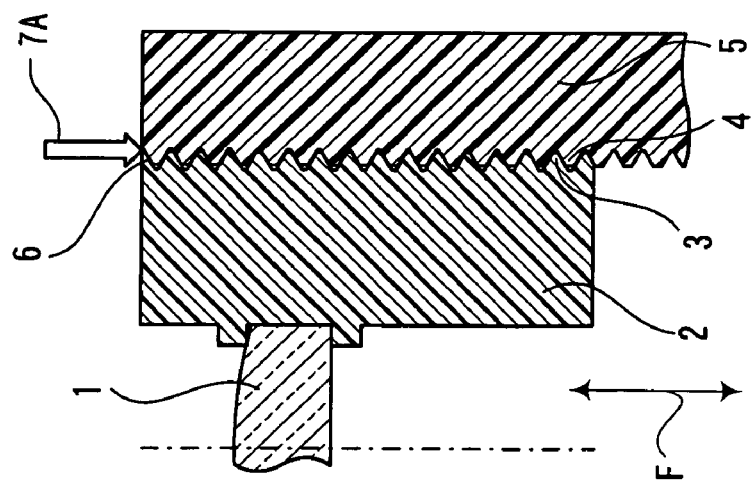

A inner lens barrel 2 and the outer lens barrel 5 of FIG. 1A are both made of polycarbonate which is a thermoplastic resin. After focus adjustment in which the protrusion amount of the inner lens barrel 2 is adjusted by rotating the inner lens barrel 2 relative to the outer lens barrel 5, as shown in the plan view of FIG. 2A, a laser beam 7A is emitted over a joint 6 of a screwing part 3 of the inner lens barrel 2 and a screwing part 4 of the outer lens barrel 5 to fix the inner lens barrel 2 and the outer lens barrel 5 by welding.

At this point, the processing conditions of the laser beam 7A were an output of 0.2 to 1.5 W and irradiation time of 0.5 to 10.0 seconds. The laser beam 7A is emitted in a linear shape of about 0.7 mm×0.1 mm along the circumferential direction of the screwing parts 3 and 4.

With welding and fixing under these processing conditions, a portion 8A melted and solidified by the laser beam 7A had a melting depth (the extending direction of the inner lens barrel 2) of about 0.5 mm to 3.0 mm as shown in FIG. 1B.

The resin is melted and the solidified thus, so that the shapes of the screwing parts 3 and 4 are changed on the melted and solidified portion 8A and the screwing function is lost. Further, the welded resin generates a strong deterrent against rotation. At this point, a torque strength in the rotation direction is 6 to 20 N·cm.

For comparison, the torque strength of fixation (fixed at two points) with a conventional UV adhesive was measured and found to be 3 to 5 N·cm. Therefore, it was confirmed that fixation performed by welding resin with the irradiation of a laser beam can obtain a higher torque strength than fixation using the conventional UV adhesive.

As described above, the laser beam 7A is emitted in a linear shape along the joint 6 of the screwing parts 3 and 4 of the inner lens barrel 2 and the outer lens barrel 5 in this manufacturing method of the camera module. When the laser beam is emitted like a spot (circle), a desired melting depth in the screwing parts 3 and 4 results in an extremely large melted area, and the resin melts on an end face 2a of the inner lens barrel 2 near a lens 1, thereby considerably degrading appearance quality. In order to avoid this problem, the inner lens barrel 2 has to become larger and thus the camera module cannot be miniaturized. As described above, the laser beam 7A is emitted in a linear shape along the joint 6 of the screwing parts 3 and 4 of the inner lens barrel 2 and the outer lens barrel 5, so that the melted resin portion does not expand to the inner side of the end face of the inner lens barrel 2 and deep melting can be performed. Further, laser irradiation parts all relate to the melting of the resin on the joint 6 near the screwing parts 3 and 4, and thus it is possible to reduce the output of laser, reduce the cost of the apparatus, and increase the life of a laser oscillator.

When a laser beam is irradiated with a fiber, an irradiation shape looks like a spot. After the laser beam passes through the fiber, when an irradiation shape like a line is formed through a complicated optical system using a cylindrical lens or the like, an irradiation head has to be large and heavy. When the head moves to perform two or more irradiations, the apparatus has to be large and heavy with a large inertial force, thereby reducing the accuracy of an irradiation position. Further, the larger optical system and apparatus increase the cost. Therefore, it is preferable to adopt laser irradiation in which a light-emitting shape like a line is formed with a simple optical system using no fiber.

Figure 2A:
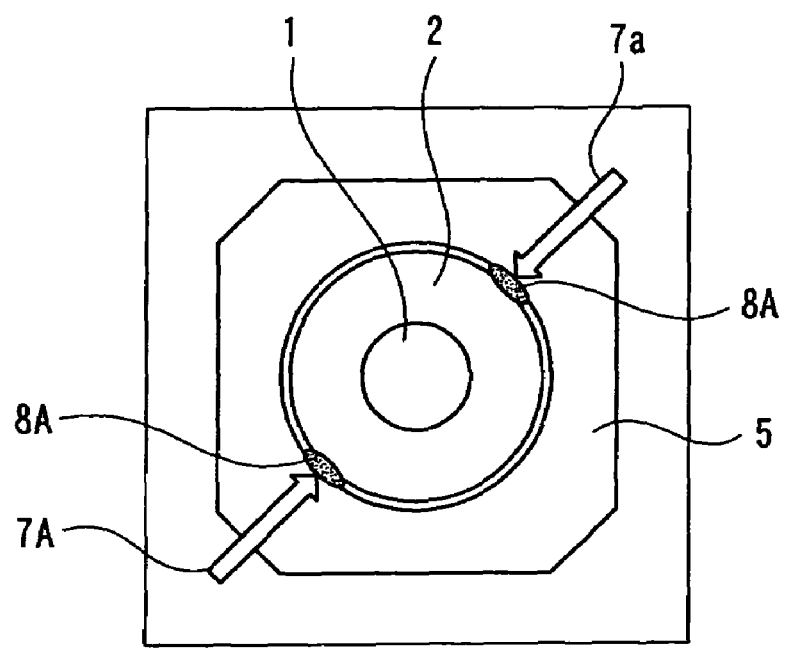
FIGS. 2A and 2B are a plan view and a side view of the camera module and show an irradiation state of a laser beam according to Embodiment 1.
Figure 2B:
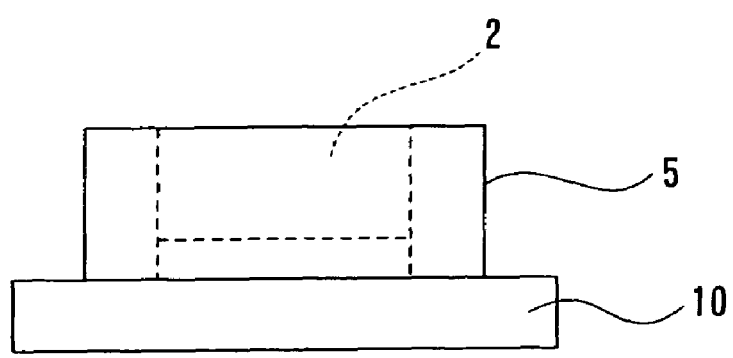

When two points at an angle of 180° were fixed by the laser beam 7A as shown in FIG. 2A, it was possible to reduce the displacement of the inner lens barrel 2 as compared with the case where only one point in the circumferential direction is fixed by the laser beam 7A. The displacement is caused by shrinkage during the solidification of the resin.

Further, the processing conditions were changed as below and processing results were compared with each other.

Laser welding was similarly performed on the camera module in which the inner lens barrel 2 and the outer lens barrel 5 shown in (Embodiment 1) are both made of polycarbonate, except for the processing condition of the irradiation shape of the laser beam 7A shown in FIG. 2A. The irradiation shape was about 0.47×0.15 mm, about 0.35×0.20 mm, and about 0.28×0.25 mm. In any case, the melding depth of the melted and solidified portion 8A was about 0.5 mm to 3.0 mm. At this point, a torque strength in the rotation direction was 5 to 20 N·cm. To be specific, a lower torque strength was obtained in the order of torque strengths of about 0.47×0.15 mm, about 0.35×0.20 mm, and about 0.28×0.25 mm.

This is because the shorter irradiation shape of the laser beam 7A on the long side along the circumferential direction of the screwing parts 3 and 4, the smaller melted and solidified portion 8A in cross section relative to the screwing parts 3 and 4. According to this result, it was found that the irradiation shape is preferably longer along an arc on a joint of the screwing parts 3 and 4 than along a radial direction of the joint.

The above explanation described the case where the inner lens barrel 2 and the outer lens barrel 5 are both made of polycarbonate which is a thermosetting resin. The present embodiment can be similarly implemented also when only one of the inner lens barrel 2 and the outer lens barrel 5 is melted and then solidified by the irradiation of the laser beam 7A. To be specific, as shown in FIG. 1C, the inner lens barrel 2 is made of polycarbonate which is a thermosetting resin and the outer lens barrel 5 is made of a metal or ceramics having a higher melting point than an ordinary resin. In this case, the processing conditions of the laser beam 7A are an output of 0.2 to 1.5 W and irradiation time of 0.5 to 10.0 seconds. The laser beam 7A is emitted in a linear shape of about 0.7 mm×0.1 mm.

In this case, the melted portion of the laser beam 7A is about 0.5 mm to 3.0 mm in melting depth. Melted resin is then solidified so as to be placed into the gap of the screw thread of an outer lens barrel 5, and thus the screwing function is lost and a deterrent is generated against the rotation of a lens fixing component. At this point, a torque strength in the rotation direction is 5 to 15 N·cm.

In the present embodiment, polycarbonate is used as a resin material. The same effect can be obtained by other thermosetting resins such as polyphthalamide and a thermosetting resin containing a glass fiber.

Embodiment 2

Figure 3:
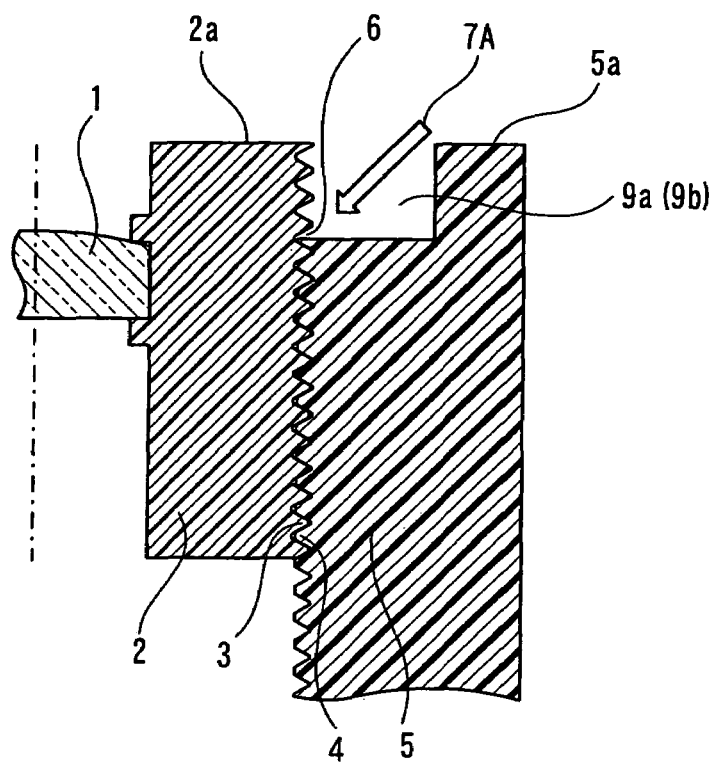
FIG. 3 is a longitudinal sectional view showing a camera module in an irradiation state of a laser beam according to (Embodiment 2) of a manufacturing method of an optical component of the present invention.
Figure 4:
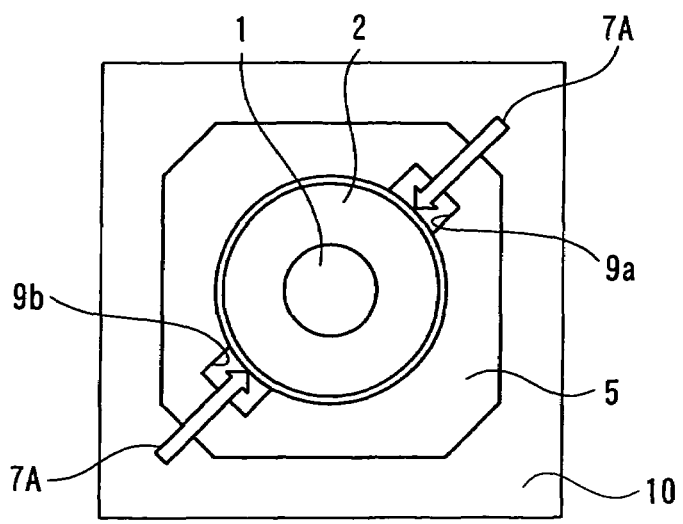
FIG. 4 is a plan view of the camera module and shows the irradiation state of the laser beam (at an angle of 180°) according to Embodiment 2.

FIGS. 3 and 4 show (Embodiment 2) of a manufacturing method of a camera module according to the present invention.

On an end face 5a of an outer lens barrel 5 of (Embodiment 2), laser beam passage openings 9a and 9b are formed 180° apart. Each of the laser beam passage openings 9a and 9b has one end opened on the screwing part of the outer lens barrel 5 and the other end opened on the end face 5a of the outer lens barrel 5. Other components are made of the same materials in the same shapes as (Embodiment 1).

An inner lens barrel 2 and the outer lens barrel 5 are both made of polycarbonate.

After focus adjustment, a laser beam was emitted in a linear shape of about 0.7 mm×0.1 mm. Laser beams 7A were emitted simultaneously from diagonally above the outer lens barrel 5 with an angle of 35°±5° relative to the vertical axis and passed through the laser beam passage openings 9a and 9b with a depth of 1 mm and a width of 2 mm to melt and cure two points along the circumferential direction of a joint 6 of a screwing part 3 of the inner lens barrel 2 and a screwing part 4 of the outer lens barrel 5. The melding depth was about 0.5 mm to 3.0 mm.

At this point, the processing conditions of the laser beam 7A were an output of 0.2 to 1.5 W and irradiation time of 0.5 to 10.0 seconds. A resin is melted thus, so that the screwing parts 3 and 4 are melted and then cured, and the screwing function is lost. Further, the welded resin generates a sufficient deterrent against rotation.

The laser beams 7A are passed through the laser beam passage openings 9a and 9b and emitted to the joint 6 in the above-described manner, so that no melted mark appears on an end face 2a of the inner lens barrel 2. Thus, it is possible to obtain a camera module with high appearance quality. To be specific, the laser beams are passed through the laser beam passage openings 9a and 9b and emitted from diagonally above the outer lens barrel 5, so that laser irradiation parts can be separated below from the end face 2a of the inner lens barrel 2. Thus, the resin does not melt on the end face 2a of the inner lens barrel 2, causing no problem in appearance quality.

The torque strength of the camera module was measured and found to be 8 to 20 N·cm. The torque strength of fixation (fixed at two points) with a conventional UV adhesive was measured and found to be 3 to 5 N·cm. Thus, as compared with the conventional UV adhesive, fixation was obtained with high appearance quality and a high torque strength. Further, fixation can be performed with laser irradiation time which is two thirds or shorter than the 15-second curing time of the UV adhesive, and thus it is possible to provide a camera module with short tact time and low cost.

Moreover, as described above, two or more axially symmetric irradiation positions can dramatically improve welding strength, thereby increasing a tolerance to use environment including high temperatures and vibrations. In the case of the camera module having the laser beam passage openings 9a and 9b disposed at an angle of 180°, a high welding strength is obtained for the above reason and laser outlets are arranged in a line. Thus, models can be easily switched only by adjusting the intervals of the irradiation positions, thereby achieving shorter model switching time and simple management of the irradiation positions.

The irradiation conditions such as an irradiation area, power, irradiation time, and an irradiation angle of the laser beam 7A depend upon a resin material and the size of the inner lens barrel 2. The irradiation conditions can be freely set to obtain a necessary welding strength. The laser beam passage openings 9a and 9b each have a depth of 1 mm and a width of 2 mm. A depth less than 1.0 mm is acceptable as long as no melted mark appears on the end face 2a of the inner lens barrel 2.

In the present embodiment, polycarbonate is used as a resin material. The same effect can be obtained by other thermosetting resins such as polyphthalamide and a thermosetting resin containing a glass fiber. The present embodiment can be similarly implemented also when one of the inner lens barrel 2 and the outer lens barrel 5 is made of ceramics or a material having a higher melting point than an ordinary resin.

Of the laser beam passage openings 9a and 9b disposed thus at an angle of 180°, a laser beam was emitted from the laser beam passage opening 9a to perform laser welding. Thereafter, a laser beam was emitted from the other laser beam passage opening 9b to perform laser welding, and then the camera module was fabricated. The welding strength was measured in a similar manner and found to be 6 to 10 N·cm.

In the case of simultaneous irradiation, the displacement of the inner lens barrel 2 from the center was reduced. The displacement is caused by shrinkage during the solidification of the resin. Therefore, it was found that simultaneous irradiation of laser beams can obtain a higher welding strength.

Embodiment 3

Figure 5:
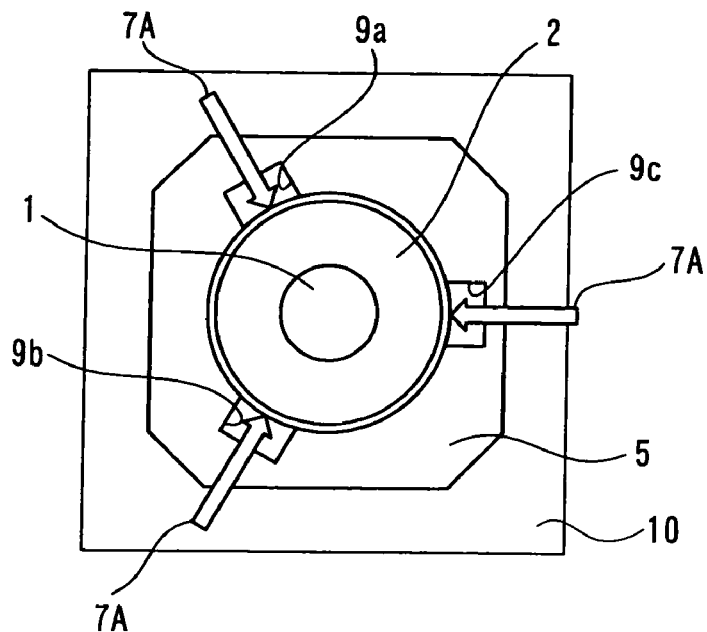
FIG. 5 is a plan view showing a camera module in an irradiation state of a laser beam (uniformly at 120°) according to (Embodiment 3) of a manufacturing method of an optical component of the present invention.
Figure 6:
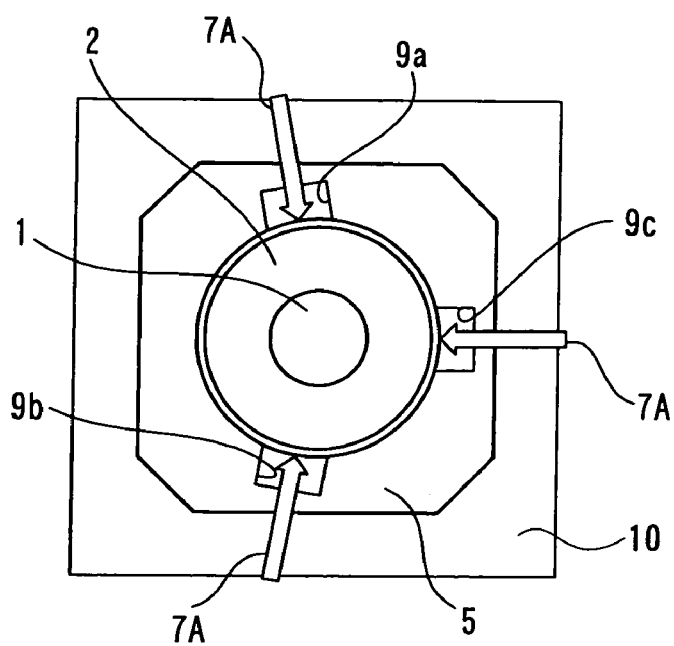
FIG. 6 is a plan view of a camera module and shows an irradiation state of a laser beam (at angles of 100°, 100°, and 160°) according to Embodiment 3.

FIGS. 5 and 6 show (Embodiment 3) of a manufacturing method of a camera module according to the present invention.

Laser welding was performed simultaneously on three points from laser beam passage openings 9a, 9b, and 9c as in (Embodiment 2) except that the laser beam passage openings 9a, 9b, and 9c on the three points of FIG. 5 were uniformly arranged at 120°. At this point, the welding strength was 12 to 20 N·cm.

As shown in FIG. 6, laser welding was performed simultaneously on three points in the same manner except that the laser beam passage openings 9a, 9b, and 9c on the three points are arranged at 100°, 100°, and 160°. At this point, the welding strength was 10 to 15 N·cm.

These results indicate that the welding strength gradually increases with the number of laser beam passage openings. Further, even when the number of laser beam passage openings is not changed, the laser beam passage openings arranged at uniform or almost uniform angles can achieve a higher welding strength.

In the present embodiment, the openings are provided at the three points. The same effect can be obtained when the number of openings is increased. For example, openings can be arranged at four, five, or six points.

In the case where laser beams are not emitted simultaneously but sequentially, the first laser beam irradiation causes solidification and shrinkage on a part of resin, and thus the inner lens barrel 2 moves to the irradiation part of the laser beam by a gap of the screwing part. The subsequent laser beam irradiation to another irradiation position does not move the inner lens barrel 2 because the inner lens barrel 2 has been fixed by the resin welding of the first laser beam irradiation. In the above-described manner, in the case where the inner lens barrel 2 is fixed thus while being tilted relative to the outer lens barrel 5, a changed focus position and a tilted lens may cause a defective image. Such a defect can be prevented by simultaneously emitting laser beams. Further, the highest welding strength is obtained when a gap is constant in the circumferential direction.

The present invention can contribute to improvement in the productivity and focus performance of a camera module and improve the camera performance of a camera mobile phone or the like.

A microscope is constituted of a plurality of objective lenses which are disposed on a revolver such that an objective lens to be used is switched. Even when the revolver is switched to replace an object lens to be used, the position of the inner lens barrel 2 relative to the outer lens barrel 5 of the objective lenses is fixed by welding beforehand in the above-described manner to eliminate the need for another focus adjustment, thereby improving the operability of the microscope and maintaining the operations for a long period of time.

What is claimed is:

1. A manufacturing method of an optical component comprising:
   adjusting an inner lens barrel comprising a threaded portion on its outer surface relative to an outer lens barrel comprising a threaded portion on its inner surface, a junction of said threaded portions forming a joint; and
   emitting a plurality of laser beams from diagonally above the outer lens barrel to melt and cure at least one surface of said joint, such that the inner lens barrel and the outer lens barrel are fixed by welding,
   wherein the outer lens barrel comprises:
      an end face adjacent to and substantially perpendicular to said inner surface, and
      a plurality of recesses on an upper inner surface, the recesses opening on the end face and on a threaded portion of the inner surface,
   the lasers pass through said recesses to weld a portion of the outer lens barrel at a bottom of said recesses to a portion of the inner lens barrel adjacent to the bottom of the recesses, and
   said plurality of laser beams are simultaneously emitted to a plurality of points along said joint.

2. The manufacturing method of the optical component according to claim 1, wherein the laser beams are emitted as line segments extending along said joint.

3. A manufacturing method of a camera module according to claim 1, comprising:
   adjusting a position of the inner lens barrel relative to the outer lens barrel; and
   emitting at least one laser beam to said joint to melt and cure at least one surface of the joint by 0.5 mm to 3.0 mm in depth.

4. The manufacturing method of the camera module according to claim 3, wherein the laser beam is a line segment extending about 0.7 mm×0.1 mm along said joint.

5. A camera module, comprising:
   an inner lens barrel comprising a threaded portion on an outer periphery and having an inner periphery for holding a lens; and
   an outer lens barrel comprising:
      a threaded portion on an inner periphery, the threaded portion for being screwed to the threaded portion of the inner lens barrel, forming a joint,
      an end face adjacent to and substantially perpendicular to said inner periphery, and
      a plurality of recesses on an upper inner periphery, such that the recesses open on said end face and said threaded portion on the inner periphery;
   wherein the recesses are located such a laser emitted from diagonally above the outer lens barrel passes through a corresponding recess to the joint portion at a bottom of the recess, and at least one surface of said joint welded by such laser extends between 0.5 mm to 3.0 mm in depth.

6. The camera module according to claim 5, comprising two or more recesses along the front of the outer lens barrel adjacent to the inner lens barrel.

* * * * *